United States Patent
Mullen

(10) Patent No.: US 10,798,912 B1
(45) Date of Patent: Oct. 13, 2020

(54) CLIMATE CONTROLLED AND COLLAPSIBLE PET SHELTER

(71) Applicant: Gail Mullen, Macon, GA (US)

(72) Inventor: Gail Mullen, Macon, GA (US)

(*) Notice: Subject to any disclaimer, the term of this patent is extended or adjusted under 35 U.S.C. 154(b) by 210 days.

(21) Appl. No.: 16/001,440

(22) Filed: Jun. 6, 2018

(51) Int. Cl.
*A01K 1/03* (2006.01)
*A01K 1/00* (2006.01)

(52) U.S. Cl.
CPC ............ *A01K 1/0076* (2013.01); *A01K 1/007* (2013.01); *A01K 1/0064* (2013.01); *A01K 1/0082* (2013.01)

(58) Field of Classification Search
CPC .... A01K 1/0076; A01K 1/0064; A01K 1/007; A01K 1/0082; A01K 1/0047; A01K 1/0052; A01K 1/0058; A01K 1/0035
See application file for complete search history.

(56) References Cited

U.S. PATENT DOCUMENTS

| 132,135 | A | | 10/1872 | Briggs |
| 2,006,280 | A | | 6/1935 | Schlueter |
| 8,276,544 | B2 | * | 10/2012 | Seltzer ................. A01K 1/0236 |
| | | | | 119/496 |
| 2002/0023594 | A1 | * | 2/2002 | Greene, Jr. ........... A01K 1/0236 |
| | | | | 119/496 |
| 2005/0241593 | A1 | * | 11/2005 | Kaura ................... A01K 1/0035 |
| | | | | 119/496 |
| 2005/0284405 | A1 | * | 12/2005 | Pomakoy-Poole ......................... |
| | | | | A01K 1/0245 |
| | | | | 119/497 |
| 2009/0159013 | A1 | * | 6/2009 | Anderson .............. A01K 1/033 |
| | | | | 119/482 |
| 2010/0319627 | A1 | * | 12/2010 | Cauchy ................ A01K 1/0236 |
| | | | | 119/500 |
| 2012/0199080 | A1 | * | 8/2012 | Siddons ................. A01K 1/033 |
| | | | | 119/448 |
| 2018/0092329 | A1 | * | 4/2018 | Zemet ................... A01K 1/0052 |

* cited by examiner

*Primary Examiner* — Trinh T Nguyen
(74) *Attorney, Agent, or Firm* — Sanchelima & Associates, P.A.; Christian Sanchelima; Jesus Sanchelima

(57) ABSTRACT

The present invention is a climate controlled and a collapsible pet shelter. The pet shelter includes a collapsible shelter structure and a HVAC system. Collapsible shelter structure is assembled to form a shelter for a pet and in dismantled form shelter structure is collapsible which provides ease for portability. One or more windows are provided that can provide adequate ventilation and can be closed when not desired. HVAC system is used for climate control and regulates/controls temperature within the pet shelter so that pet can comfortably enjoy stay. HVAC system is mainly powered by solar energy and is an independent system. Also, doors with flexible strips are provided that maintain the internal environment of the pet shelter. Also flexible strips provide easy movement of pet in and out of pet shelter.

13 Claims, 4 Drawing Sheets

CLIMATE CONTROLLED AND COLLAPSIBLE PET SHELTER

BACKGROUND OF THE INVENTION

1. Field of the Invention

The present disclosure relates to a pet shelter. More particularly, the present disclosure relates to a collapsible pet shelter in which the interior temperature can be regulated.

2. Description of the Related Art

At many places, pets are sheltered at owners home where there is controlled/regulated temperature. Sheltering at owners home may occupy internal home space which can be utilized for other purposes. Further, providing sheltering at owners home, pets are handicapped to move in and out of the door by themselves and need assistance from owners to open and close the door each time. Thus, natural movements of pets are restricted when they wish to move around in foyer/porch or backyard. There is thus a need to provide a shelter for pets in foyer/porch or backyard owing to ample un-utilized space. However, it is not feasible to provide a shelter in foyer/porch or backyard because of extreme external climatic conditions. Further, when owners relocate, it is difficult to carry along with an existing pet shelters because of its non-collapsible structure.

Several designs of various pet houses have been designed in the past. None of them, however, include a pet shelter that can be easily collapsible for ease of portability, provides regulated temperature control in variable climatic conditions and facilitates natural movement of pets in accordance with their wish.

Applicant believes that a related reference corresponds to US patent application 20130132135 filed by Pets Too LLC titled 'Kennel system' disclose a kennel system to be used commercially at hotels, resorts or during travel of the pet owner. The owner has total control of the care of the pet, using the automated features of the unit and controlled through a remote computer system. Though the present disclosure discloses about usage of HVAC system as optional feature however, the present disclosure does not explicitly mentions about collapsible structure for ease of portability and also may not facilitate natural movement of pets.

Another US patent application 2012006280 filed by 'GRAY DANIEL and TBB ENTPR LLC titled 'Weatherized Pet House' discloses a weatherized pet house including means for supplying HVAC from a building for keeping the air in the pet house at desirable levels in hot or cold weather which in turn keeps water drinkable in a water dish inside the structure. Although, the present disclosure mentions about HVAC system, however, the HVAC system receives cool or hot air from a structure (residential structure) and hence is required to be fixed in one position and cannot be placed anywhere except nearby the HVAC duct coining out of the structure. Also, the weatherized pet house does not explicitly mention about collapsible structure desired for easy portability.

Other documents describing the closest subject matter provide for a number of more or less complicated features that fail to solve the problem in an efficient and economical way. None of these patents suggest the novel features of the present invention.

SUMMARY OF THE INVENTION

In view of the above, it is an objective of the present invention to solve or at least reduce the problems discussed above. The present invention is a climate controlled and a collapsible pet shelter. The pet shelter includes a collapsible shelter structure and a HVAC system. Collapsible shelter structure is assembled to form a shelter for a pet and in dismantled form shelter structure is collapsible which provides ease for portability. One or more windows are provided that can provide adequate ventilation and can be closed when not desired. HVAC system is used for climate control and regulates/controls temperature within the pet shelter so that pet can comfortably enjoy stay. HVAC system is mainly powered by solar energy. Also, doors with flexible strips are provided that maintain the internal environment of the pet shelter. Also flexible strips provide easy movement of pet in and out of pet shelter.

It is one of the main objects of the present invention is to provide a pet shelter featured with climate control for controlling/regulating internal climate based on external climate conditions and easily collapsible for ease of portability.

It is another object of this invention is to provide a pet shelter that is pet friendly by facilitating natural movements of pet owing to flexible entrance and exit and hence need not be dependent on owners.

It is another object of this invention is to provide a pet shelter that is easy to assemble and dis-assemble in less time and efforts.

It is another object of this invention is to provide a pet shelter that can be powered with natural light source.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
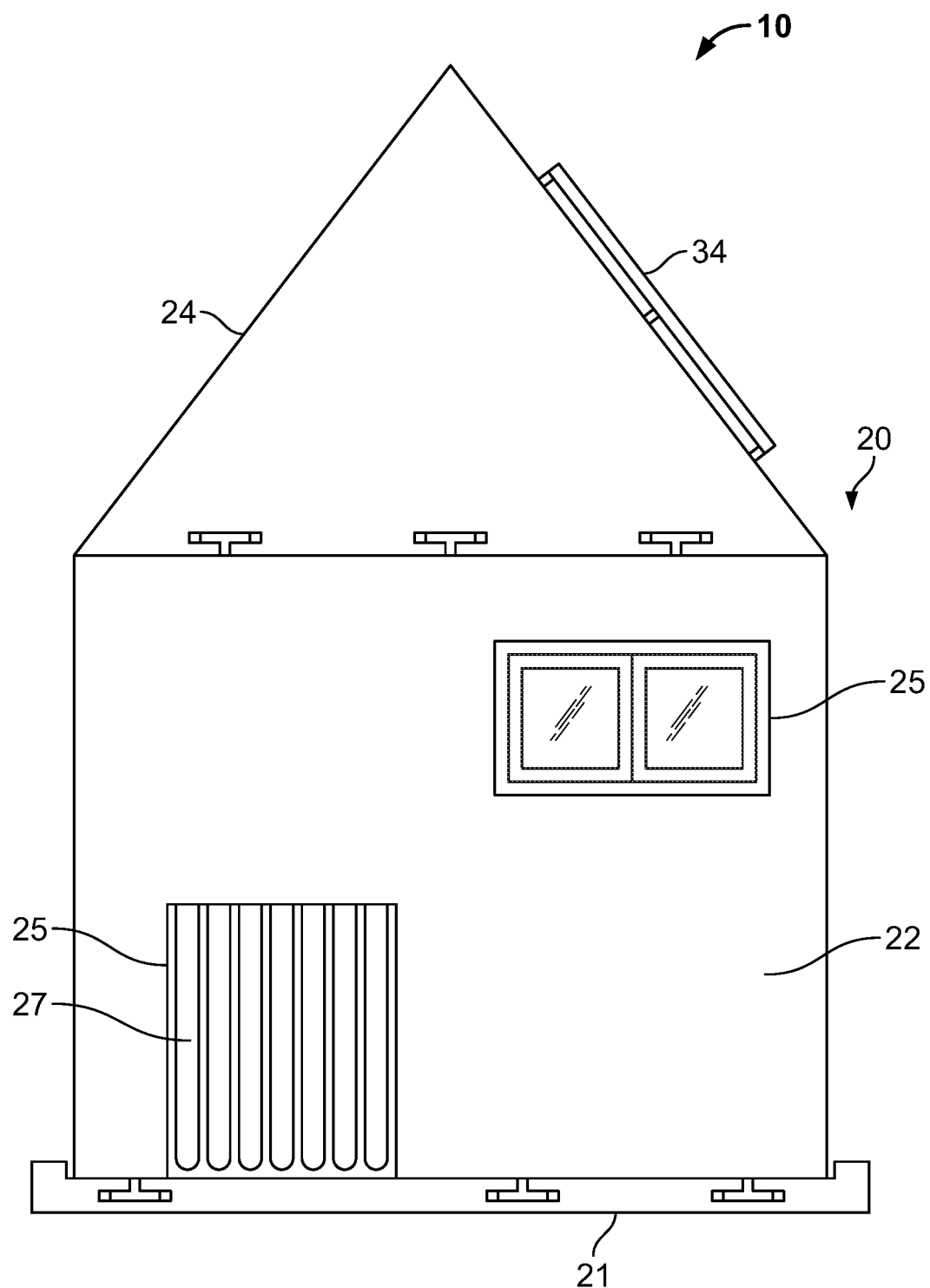
FIG. 1 represents a schematic front view of a pet shelter, in accordance with one embodiment of the present invention.
Figure 2:
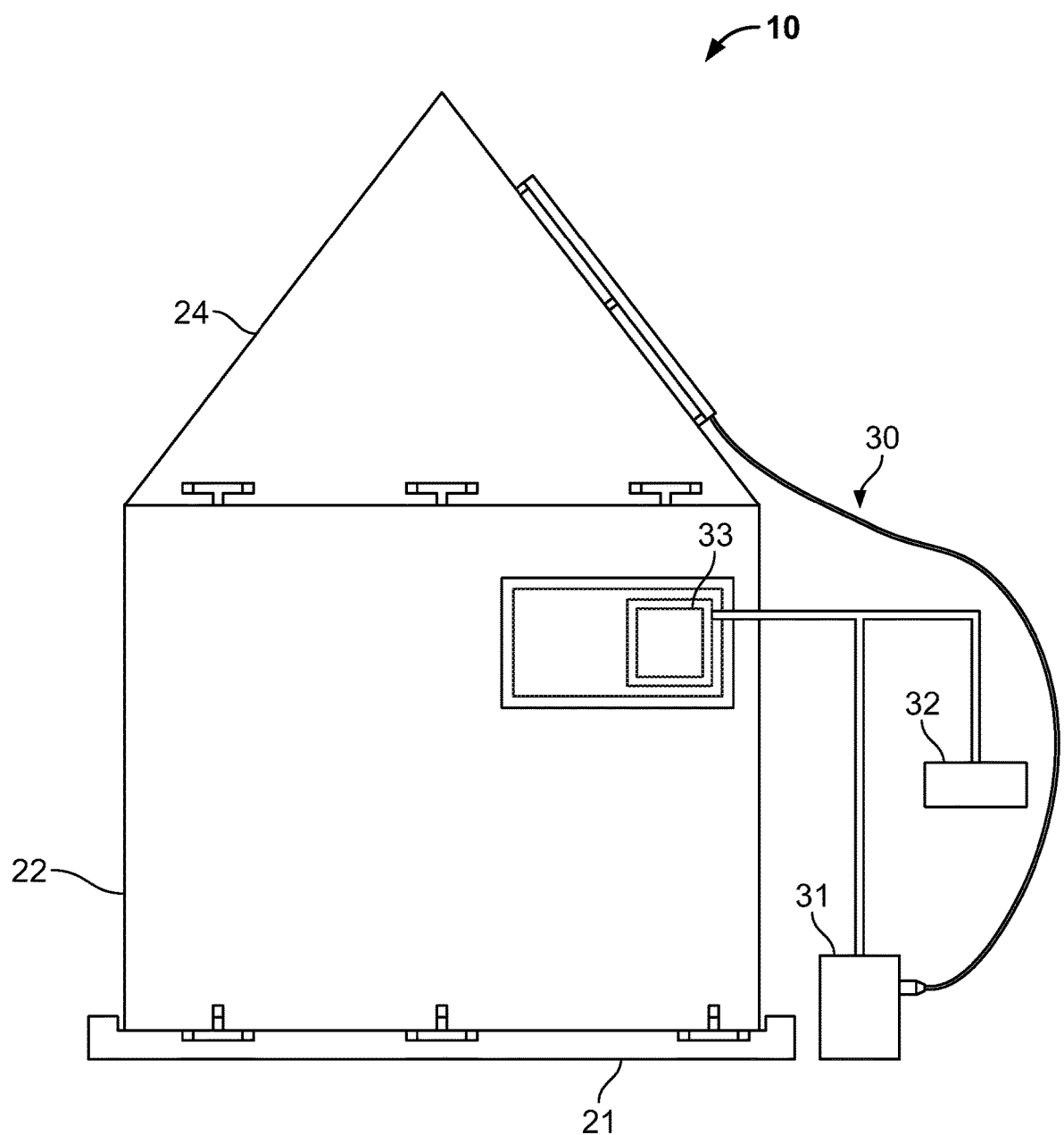
FIG. 2 represents schematic back view of the pet shelter of FIG. 1 with a solar unit.
Figure 3:
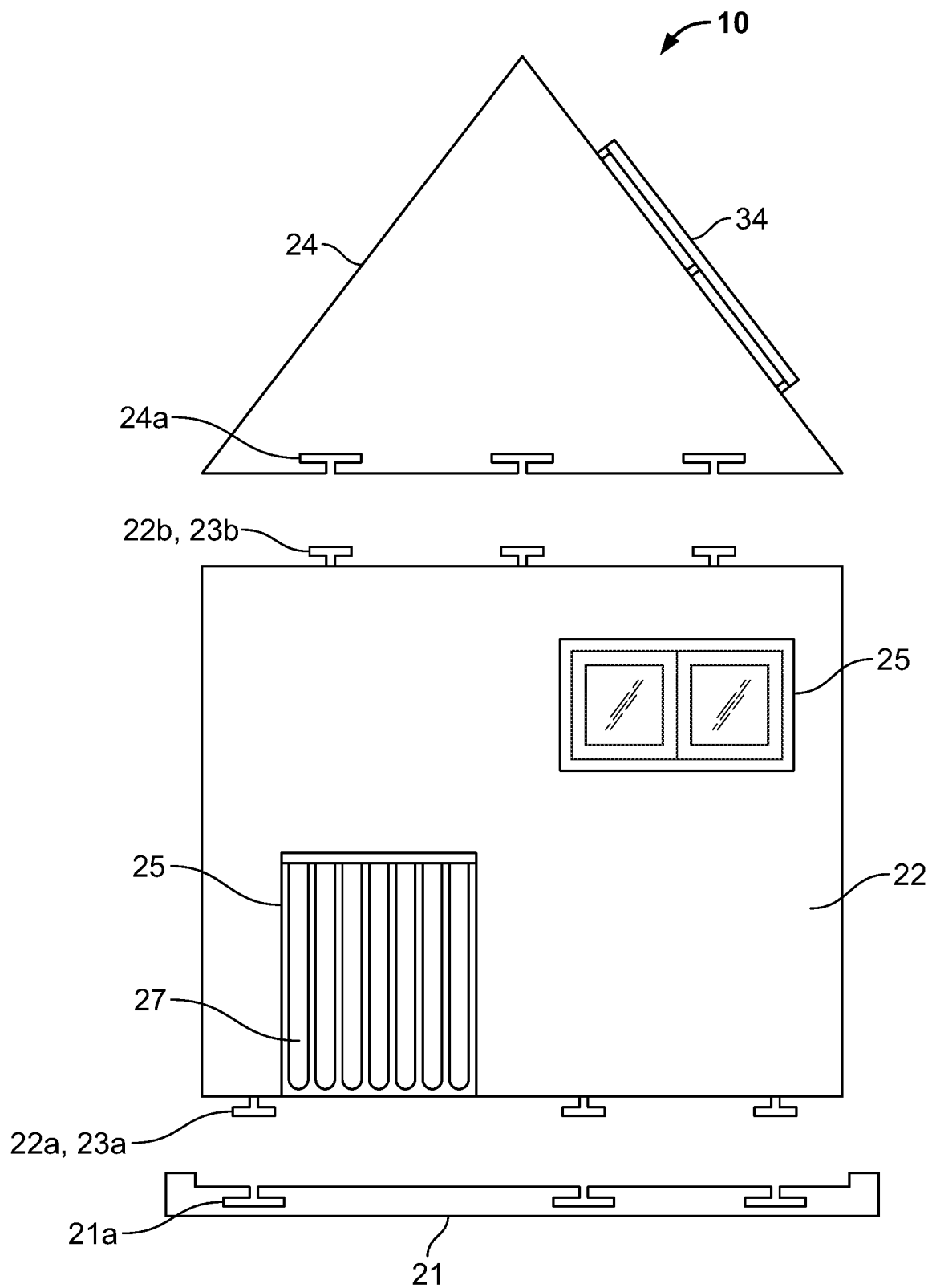
FIG. 3 represents an exploded front view of the pet shelter of FIG. 1 depicting interlocking elements.
Figure 4:
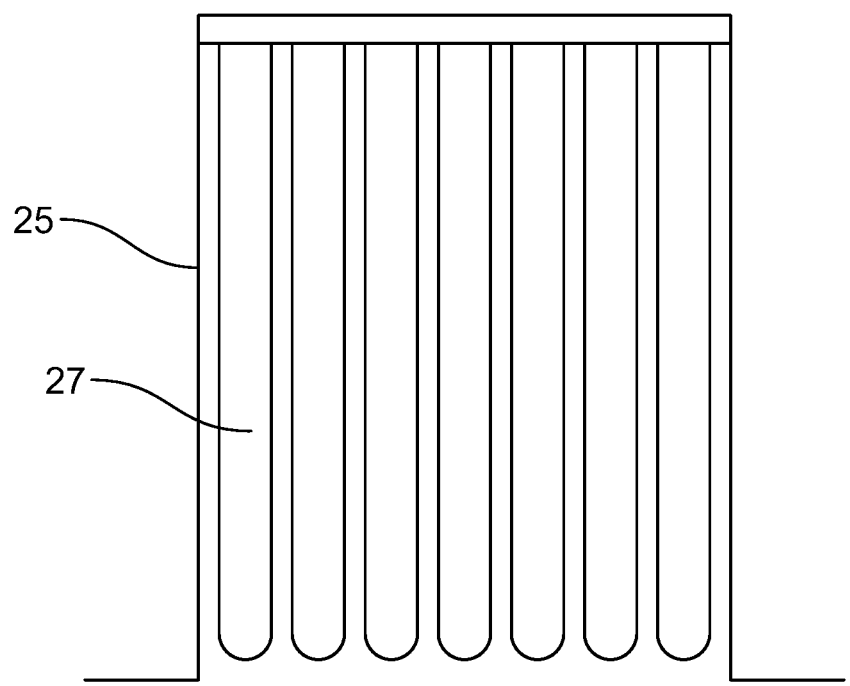
FIG. 4 is a flexible door of the pet shelter of FIG. 1.

Referring now to the drawings (FIGS. 1 to 4), where the present invention is generally referred to with numeral 10, it can be observed that a climate controlled and collapsible pet shelter, in accordance with one embodiment, is provided that includes a collapsible shelter structure 20 and a HVAC system 30.

Collapsible shelter structure 20 includes a base 21, a front wall 22, a back wall 23, side walls (not illustrated in Figures) and a roof 24. Base 21 is a single piece element or can be formed by assembling number of elements. Similarly, each of front wall 22, back wall 23, side walls (not illustrated in Figures) and roof 24 can be single piece elements or each can be formed by assembling number of elements. Base 21, front wall 22, back wall 23, side walls (not illustrated in Figures) and roof 24 are assembled with each other to form an enclosed shelter structure formed by using complementary interlocking elements. In one embodiment, base 21 can be retractable and removed for easy maintenance. In one embodiment, complementary interlocking elements are male and female joints. For instance, the peripheral portion of base 21 is provided with a number of female elements 21*a* which is complimentary with male elements 22*a* of front wall 22, male elements 23*a* of back wall 23 and male elements (not illustrated in Figures) of side walls. Also, male elements 22*b* of front wall 22, male elements 23*b* of back wall 23 and male elements (not illustrated in Figures) of side walls are complementary with female elements 24*a* of roof 24. Although, the description is described by front wall 22, back wall 23, side walls (not illustrated in Figures) having respective male elements 22*a*, 23*a* and 24*a* at operative bottom portions and male elements 22*b*, 23*b* and 24*b* at operative top portions, however, there can be interchangeability of providing female elements at operative top portions or at operative bottom portions Thus, the provision of male elements and female elements can be provided as per need of the invention. Similarly, side walls are connected to front wall 22, back wall 23, base 21 and roof 24 by using such complementary interlocking elements. Such complementary interlocking elements facilitate easy assembling and dismantling of shelter structure 20 thus making it collapsible and portable, especially during travel. One or more of front wall 22, back wall 23, base 21 and roof 24 can be provided with at least one window 25, typically a sliding window. In another embodiment, interlocking elements are in form of grooves and protrusions (not illustrated in Figures) which are complementary with each other.

Further, at least one door 26 is provided with a number of flexible straps 27 that provides easy entry in and exit from collapsible shelter structure 20. Such flexible straps 27 along with providing easy entry and exit of pets, also helps to maintain temperature within the collapsible shelter structure 20.

HVAC system 30, i.e. heating, ventilation and air conditioning system, mainly includes a cooling unit 31, a heating unit 32 and a common duct 33. Common duct 33 is connected to cooling unit 31 and heating unit 32. Cooling unit 31 is configured to circulate cool air in common duct 33 and heating unit 32 is configured to circulate warm air in common duct 33. Common duct 33 circulates cool and/or warm air in the interior of collapsible shelter structure 20. HVAC system 30 is powered by solar energy generated by a solar system. Solar panel 34 of solar system in one embodiment is provided on roof 24. The present disclosure is not limited to use of solar energy and other renewable or non-renewable sources of energy can be used to power HVAC system 30. In one embodiment, HVAC system 30 can be automatically and remotely controlled by owners using sensors (not illustrated in Figures) and controller (not illustrated in Figures). Also, insulations can be provided that insulates collapsible shelter structure 20 and hence increase efficiency of HVAC system 30.

Size of climate controlled and collapsible pet shelter 10 can be modular in various sizes to accommodate different size of pets. Also, material of pet shelter 10 can be selected such that it is light in weight (by usage typically polymeric material), less cost and durable. Owing to independent HVAC system 30 for regulating climate in various seasons, pet shelter 10 can be positioned anywhere in foyer/porch or backyard, hence making use of un-utilized space and also because of flexible door 26 natural movements of pets is possible.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A collapsible shelter structure, comprising:
a base, a front wall, a back wall, side walls, and a roof, an opening covered by a curtain made of flexible strips extending to a ground surface and adapted to allow access to an interior of said collapsible shelter structure, an HVAC system having a cooling unit adapted to cool said collapsible shelter structure, said base is connected to said back, side, and front walls using male and female interlocking members, and said roof is connected to said back, side, and front walls using male and female interlocking members, said base being wider than said front wall, said back wall and said roof, said base having peripheral members extending outwardly and away from said base on peripheral sides thereof, said peripheral members being parallel to said front wall and said back wall, said male interlocking members extending along a top edge and bottom edge of said front wall and said back wall about a width of said front wall and said back wall, said cooling unit being parallel to said base and said back wall, said female interlocking members being recessed within a roof bottom edge and a base top edge.

2. The shelter structure of claim 1 wherein said base is formed by assembling two or more portions of said front wall, said back wall or said side walls.

3. The shelter structure of claim 1 wherein said base is retractable.

4. The shelter of claim 1 wherein said flexible strips are made of plastic.

5. The shelter of claim 1 including at least one window, said at least one window being on said front wall, said at least one window being entirely above of said opening.

6. The shelter of claim 1 wherein said HVAC system includes a heating unit, said heating using being entirely above of said cooling unit, said heating unit and said cooling unit both interconnected to a same common duct, said common duct being on said back wall.

7. The shelter of claim 1 wherein said HVAC system is solar powered by solar panels, said solar panel being mounted on said roof.

8. The shelter of claim 5, wherein said at least one window is a sliding window.

9. The shelter of claim 5, wherein said opening extends vertically, said at least one window extends horizontally, said opening and said at least one window being on perpendicular planes.

10. The shelter of claim 1, wherein said flexible strips are evenly spaced apart and parallel to each other, said flexible strips being entirely above of said base.

11. The shelter of claim 1, wherein said flexible strips include rounded distal ends.

12. The shelter of claim 1, wherein said male interlocking members and said female interlocking members are T shaped.

13. The shelter of claim 1, wherein said male interlocking members being vertical and extending outwardly and away from said front wall and said back wall.

* * * * *